United States Patent
Lo et al.

(10) Patent No.: US 11,994,757 B2
(45) Date of Patent: May 28, 2024

(54) HYBRID CMOS COMPATIBLE ELECTRO-OPTIC DEVICE

(71) Applicant: ADVANCED MICRO FOUNDRY PTE. LTD, Singapore (SG)

(72) Inventors: Patrick Guo Qiang Lo, Singapore (SG); Shawn Yohanes Siew, Singapore (SG); Larry Lian Xi Jia, Singapore (SG)

(73) Assignee: ADVANCED MICRO FOUNDRY PTE. LTD., Singapore (SG)

( * ) Notice: Subject to any disclaimer, the term of this patent is extended or adjusted under 35 U.S.C. 154(b) by 330 days.

(21) Appl. No.: 17/432,276

(22) PCT Filed: Apr. 24, 2020

(86) PCT No.: PCT/SG2020/050253
§ 371 (c)(1),
(2) Date: Aug. 19, 2021

(87) PCT Pub. No.: WO2020/218975
PCT Pub. Date: Oct. 29, 2020

(65) Prior Publication Data
US 2022/0252913 A1  Aug. 11, 2022

(30) Foreign Application Priority Data
Apr. 25, 2019  (SG) .......................... 10201903757W (51) Int. Cl.
*G02F 1/035* (2006.01)
*G02B 6/12* (2006.01)
(Continued)

(52) U.S. Cl.
CPC ............... *G02F 1/035* (2013.01); *G02B 6/12* (2013.01); *G02F 1/025* (2013.01); *G02F 1/225* (2013.01);
(Continued)

(58) Field of Classification Search
CPC ....... G02F 1/225; G02F 1/2255; G02F 1/2257
See application file for complete search history.

(56) References Cited

U.S. PATENT DOCUMENTS 7,224,878 B1 * 5/2007 Wessels ................ G02F 1/0356
385/2
2006/0222281 A1 * 10/2006 Deliwala ................ G02F 1/011
385/39
(Continued)

FOREIGN PATENT DOCUMENTS

CN  107843957 A  3/2018

OTHER PUBLICATIONS

Y. Yamada et al. An application of a silica-on-terraced-silicon platform to hybrid Mach-Zehnder interferometric circuits consisting of silica-waveguides and LiNbO3 phase-shifters. IEEE Photonics Technology Letters, 6:7:822-824, Jul. 1994. (https://doi.org/10.1109/68.311466) (Year: 1994).*

(Continued)

*Primary Examiner* — Michael Stahl
(74) *Attorney, Agent, or Firm* — Bookoff McAndrews, PLLC (57) ABSTRACT

A hybrid photonic chip comprising a plurality of semiconductor materials arranged to define a chip providing a function, wherein at least a first part of the chip is formed of materials which can be fabricated using a CMOS technique; and at least a second part of the chip which comprises non-linear crystal material and is not subjected to etching process; wherein the second part of the chip in conjunction with the first part is configured to support a propagating low loss single mode.

17 Claims, 8 Drawing Sheets (51) Int. Cl.
  *G02F 1/025* (2006.01)
  *G02F 1/225* (2006.01)
  *G02F 1/355* (2006.01)

(52) U.S. Cl.
  CPC .............. *G02B 2006/1204* (2013.01); *G02B 2006/12047* (2013.01); *G02B 2006/12097* (2013.01); *G02B 2006/12142* (2013.01); *G02B 2006/12176* (2013.01); *G02F 1/3553* (2013.01); *G02F 2201/063* (2013.01)

(56) References Cited

U.S. PATENT DOCUMENTS

| | | | |
|---|---|---|---|
| 2009/0067771 A1* | 3/2009 | Chen ...................... | G02F 1/225 438/31 |
| 2012/0189239 A1 | 7/2012 | Tu | |
| 2013/0071058 A1 | 3/2013 | Lim | |
| 2015/0333831 A1* | 11/2015 | Lai ........................ | G02B 6/428 250/208.2 |
| 2017/0351027 A1* | 12/2017 | Reano .................... | G02B 6/12 |

OTHER PUBLICATIONS

W. Bogaerts et al. Silicon photonics circuit design: methods, tools, and challenges. Laser & Photonics Reviews, Mar. 2018. (https://doi.org/10.1002/lpor.201700237) (Year: 2018).*

R. Safian et al. Foundry-compatible thin film lithium niobate modulator with RF electrodes buried inside the silicon oxide layer of the SOI wafer. Optics Express, 28:18:25843-25857, Aug. 2020. (https://doi.org/10.1364/OE.396335) (Year: 2020).*

P.O. Weigel et al. Bonded thin film lithium niobate modulator on a silicon photonics platform exceeding 100 GHz 3-dB electrical modulation bandwidth. Optics Express, vol. 26, No. 18, pp. 23728-23739, Aug. 29, 2018 (https://doi.org/10.1364/OE.26.023728) (Year: 2018).*

L. Chang et al. Heterogeneous integration of lithium niobate and silicon nitride waveguides for wafer-scale photonic integrated circuits on silicon. Optics Letters, vol. 42, No. 4, pp. 803-806, Feb. 13, 2017 (https://doi.org/10.1364/OL.42.000803) (Year: 2017).*

L. Chen et al. Hybrid silicon and lithium niobate electro-optical ring modulator. (Optica, vol. 1, No. 2, pp. 112-118, Aug. 15, 2014 (https://doi.org/10.1364/OPTICA.1.000112) (Year: 2014).*

International Preliminary Report on Patentability PCT/SG2020/050253 filed Apr. 24, 2020; Report dated May 11, 2021.

International Search Report for corresponding application PCT/SG2020/050253 filed Apr. 24, 2020; Report dated Oct. 6, 2020.

Written Opinion for corresponding application PCT/SG2020/050253 filed Apr. 24, 2020; Report dated Oct. 6, 2020.

* cited by examiner

HYBRID CMOS COMPATIBLE ELECTRO-OPTIC DEVICE

FIELD OF THE INVENTION

The present invention relates to an electro-optic device, particularly, but not exclusively to a Hybrid Strip Loaded Electro-Optic Modulator.

BACKGROUND

Silicon photonics has significant advantages that makes it a good candidate for optical modulators, especially those used in short haul distances. These advantages include a mature fabrication process, ability to leverage the advantages of CMOS processing, cheap low-cost mass fabrication and electro-optic tunability via the carrier injection/depletion effect. Silicon photonics waveguides are submicron and have a high index contrast which allows for sharp bending and compact structures with a low footprint. However, for modulation, silicon photonics also has some drawbacks such as a slow speed (due to the speed of the PN junction/carrier depletion), and some electrical nonlinearity (which degrades the spurious free dynamic range among other drawbacks).

For different applications some materials are better than others better than others.

For example, nonlinear crystal materials (sometimes referred to as $\chi^2$ materials) such as lithium niobate (LiNbO$_3$) are of interest when designing modulator, especially for long haul optical communication. They have the benefit of low insertion loss, low propagation loss and high-speed modulation. However, traditional methods of defining a waveguide are titanium diffusion and proton exchange, and these induce a low index change. Thus, single-mode waveguides are on the 5-micron scale, and bending losses are extremely high. This means that the footprint of for example, lithium niobate devices, are large. Also, the placement of electrodes must be well separated as the tail-off of the mode is long, leading to reduced modulation efficiency. These factors impose a 'pragmatic' limit of the modulation speed which is much lower than the 'theoretical' limit.

There are several issues with using lithium niobate in a CMOS fabrication process. Generally, lithium niobate is not compatible with standard CMOS fabrication. One issue is contamination due to the etching by-products of lithium niobate. In addition, lithium niobate is difficult to etch anisotropically and rough sidewalls are produced which lead to high propagation losses. Lithium niobate has been used to form ridge waveguides, however the etching of smooth sidewalls for lithium niobate is a persistent issue. The state of the art etching creates highly sloped sidewalls (~45 degrees), and this can affect the mode profile negatively. There have been proposals to overcome some of the issues with using lithium niobate but none has resulted in an optimum or practical solution.

The prior art has known to have a number of problems, these include:
- problems associated with etching of non-CMOS compatible material,
- problems associated with the optical propagating mode primarily residing outside the $\chi^2$ materials, and/or
- problems associated with an appropriate method to modulate the device.

As a result, prior art either cannot be implemented in standard silicon photonics fabrication process or cannot obtain sufficient efficiency due to the high optical power outside the $\chi^2$ region.

The present invention seeks to solve at least some or all of these problems.

One possible improvement to design and manufacture of modulator would be to combine silicon photonics with lithium niobate structures. As is clear from above this is not simple. The present invention seeks to find a solution to at least some of these problems.

One object of the present invention is this to combine silicon and lithium niobate to form photonic devices.

A further object is to improve the process of combining silicon and lithium niobate.

A further object is to produce improved modulators.

The embodiments described below are not limited to implementations which solve any or all of the disadvantages of the prior art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present invention there is provided a hybrid photonic chip comprising a plurality of semiconductor materials arranged to define a chip providing a function, wherein at least a first part of the chip is formed of materials which can be fabricated using a CMOS technique; and at least a second part of the chip is not susceptible to be fabricated during a CMOS technique; wherein the second part of the chip in conjunction with the first part is configured to support a propagating low loss single mode waveguide.

Preferably, the at least second part of the chip comprises a nonlinear crystal material ($\chi^2$ material or any other electro-optic material).

Preferably, the nonlinear crystal material may be an $\chi^2$ material or any other electro-optic material, for example: lithium niobate (LiNbO$_3$), lithium tantalate (LiTaO$_3$), potassium niobate (KNbO$_3$), barium titanate (BaTiO$_3$), potassium titanyl phosphate (KTiOPO$_4$), barium borate (BaB$_2$O$_4$)

Preferably, the first part of the chip comprises one or more silicon strips on a silicon on insulator, SOI, platform that do not support single mode propagation alone.

Preferably, the second part of the chip and the one or more silicon strips support single mode propagation together.

Preferably, the hybrid chip is a modulator.

Preferably, the second part of the chip is a waveguide configured to substantially support the optical mode primarily in the nonlinear crystal material.

Preferably, the modulator is a Mach Zehnder modulator.

Preferably, the first part of the chip includes electrodes.

Preferably, the electrodes are located in gaps in a buried oxide of the first part of the chip to received bonding pads from the second part of the chip.

Preferably, the second part of the chip is applied to the first part of the chip via a flip-chip bonding technique.

Preferably, the electrodes are connected to the second part of the chip during the flip-chip bonding technique.

According to a second aspect of the present invention there is provided a method of fabricating a hybrid photonic chip, that excludes the etching of the nonlinear crystal material, the method comprising: forming a first part of a chip from semiconductor materials on a silicon on insulator, SOI, platform using a CMOS fabrication process; applying a second part of the chip without a CMOS processing step to the first part of the chip; the second part of the chip being of material configured to substantially support a single propagation mode of the chip.

Preferably, forming one or more silicon strips on the SOI platform that do not support single mode propagation alone.

Preferably, forming the hybrid chip is a modulator.

Preferably, forming the second part of the chip as a waveguide configured to substantially support the single propagation mode.

Preferably, forming the modulator as a Mach Zehnder modulator.

Preferably, forming electrodes as a part of the first part of the chip.

Preferably, etching gaps into a buried oxide layer of the SOI platform; forming the electrodes located in the gaps in the buried oxide of the first part of the chip to received bonding pads from the second part of the chip.

Preferably, applying the second part of the chip to the first part of the chip in a flip-chip bonding technique.

Preferably, the electrodes are connected to the second part of the chip during the flip-chip bonding technique.

According to a third aspect of the present invention there is provided process design kit for forming a photonic integrated chip which when processed in a chip fabrication system causes the chip fabrication system to from the photonics integrated chip of another aspect.

According to a fourth aspect of the present invention there is provided a computer readable storage medium having stored thereon a computer readable description of a chip that, when processed in chip fabrication system, causes chip fabrication system to manufacture a photonic integrated chip of another embodiment.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1A:
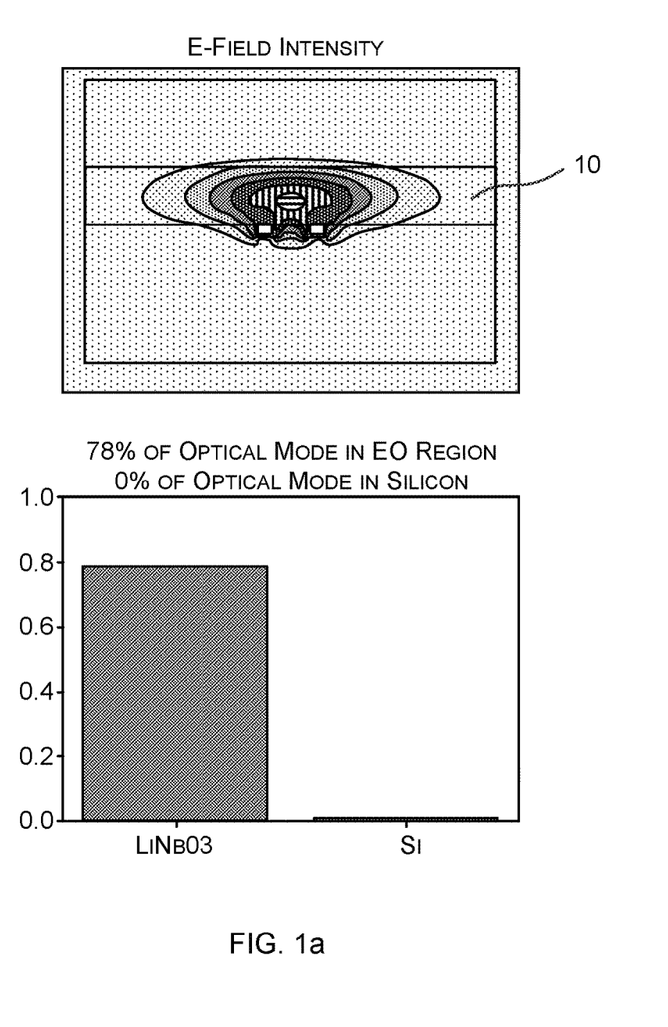
FIGS. 1a and 1b show a representation of the E-Field intensity in two different material combinations, according to an embodiment of the invention.
Figure 1B:
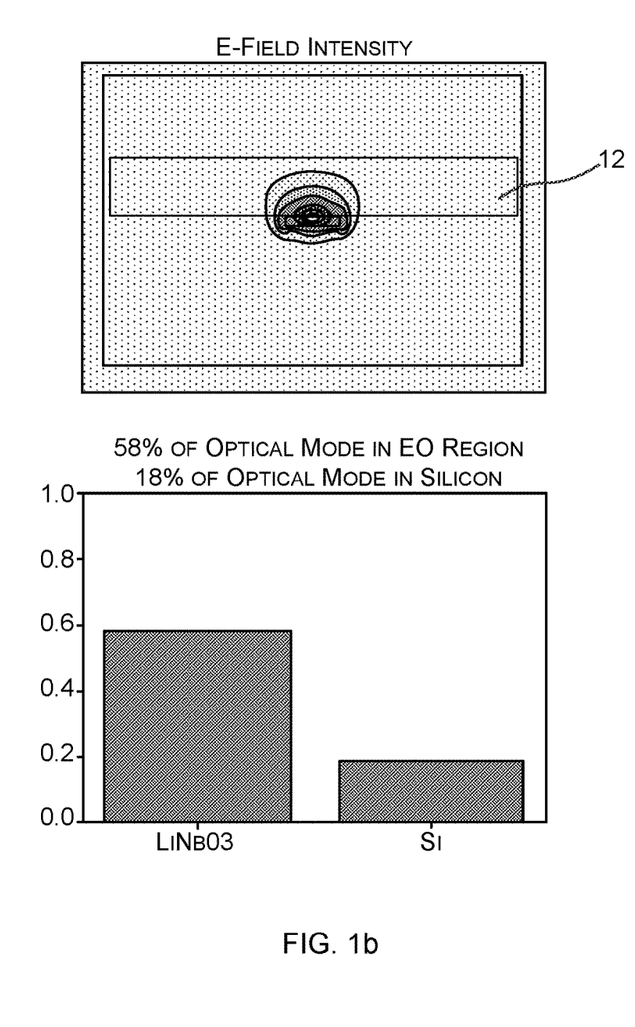

The present invention relates to the combination of a silicon photonics platform with lithium niobate by optimizing the strengths of each platform and mitigating the weaknesses of both. To achieve this the invention relates to a process, such as for example, flip chip bonding, for bonding lithium niobate on an insulator of a CMOS-fabricated device, such as for example a waveguide. The CMOS device may be made from material including silicon, silicon nitride and many others, as will be appreciated by those skilled in the art. The process entails careful engineering which allows the waveguide mode to exist primarily in the lithium niobate region (or the $\chi^2$ material region) rather than in the CMOS-fabricated waveguide region (or the silicon region). This is important as the $\chi^2$ material is electro-optically active, and silicon is not. Any overlap of waveguide mode into the non-electro-optically active region will reduce the modulators efficiency. This is illustrated in FIG. 1, where with careful design a high proportion of power resides within the lithium niobate rather than silicon. The lithium niobate layer is labeled 10 and 12 in FIGS. 1a and 1b.

Figure 2A:
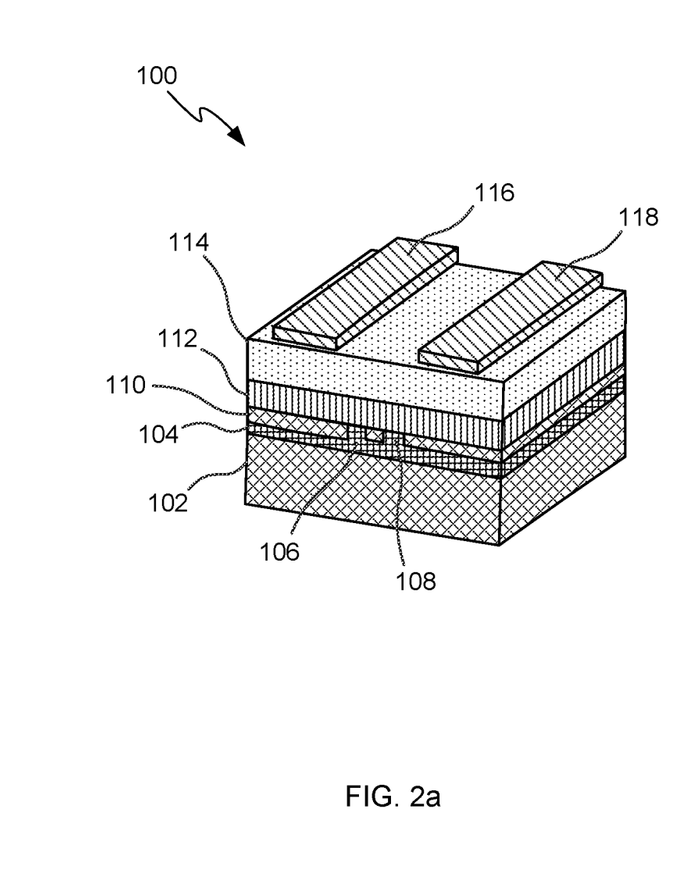
FIGS. 2a and 2b show schematic cross-sectional diagrams of two possible modulators, according to embodiments of the invention.

Referring to FIG. 2a, a device is shown generally at 100. The device 100 is a modulator. The modulator includes a buried oxide layer 102 and a silicon waveguide 104 which in this example is referred to as rib type silicon waveguide having two ribs 106 and 108. A further silicon dioxide layer 110 is located over the waveguide. Lithium niobate 112 is connected to the ribs of the waveguide 106 and 108 and the silicon dioxide layer 110. A silicon dioxide layer 114 is located over the lithium niobate and electrodes 116 and 118 are located at the top of the device. This device is referred herein as a hybrid silicon $\chi^2$ modulator. The lithium niobate is the $\chi^2$ material.

The two silicon strips or ribs together with the thin lithium niobate layer can support a propagating optical single mode. Individually each element cannot support a propagating single mode. In this invention, the power of the optical mode primarily resides in the electro-optically active region, rather than the silicon strips or ribs. This present invention describes the careful engineering required, such that majority of the optical mode is contained within the lithium niobate region. It is important that individually any element cannot independently support single mode. Otherwise, such as in other designs, a lot of the mode will exist in the silicon strip which is undesirable.

$\chi^2$ materials are materials that possess a $\chi^2$ nonlinearity. This means that these materials have a nonlinear polarization density response to the electric field. As a result, these materials demonstrate an electro-optic effect, where the refractive index changes due the presence of an applied electric field. These materials are sometimes referred to as nonlinear crystal materials and include by way of example: lithium niobate ($LiNbO_3$), lithium tantalate ($LiTaO_3$), potassium niobate ($KNbO_3$), barium titanate ($BaTiO_3$), potassium titanyl phosphate ($KtiOPO_4$), barium borate ($BaB_2O_4$), etc.

An example of an electro-optic effect is the Pockels effect, where the refractive index changes linearly with an applied electric field.

As discussed, lithium niobate is a difficult material to process (especially to etch) and is also not compatible with standard CMOS fabrication. Thus, the present invention does not include any processing of the lithium niobate layer as will be described in greater detail below. As a result, this allows integration with standard CMOS fabrication and provides one of the advantages of the present invention.

Returning now to FIG. 2b this shows a second type of modulator 120 sometimes referred to as a ridge type modulator. This device includes a buried oxide layer 122 in which waveguides 124 and 126 are formed. Lithium niobate 128 is located and in contact with the waveguides. A silicon dioxide layer 130 is located over the lithium niobate and electrodes 132 and 134 are located at the top of the device. This device is another hybrid silicon $\chi^2$ modulator.

Figure 2B:
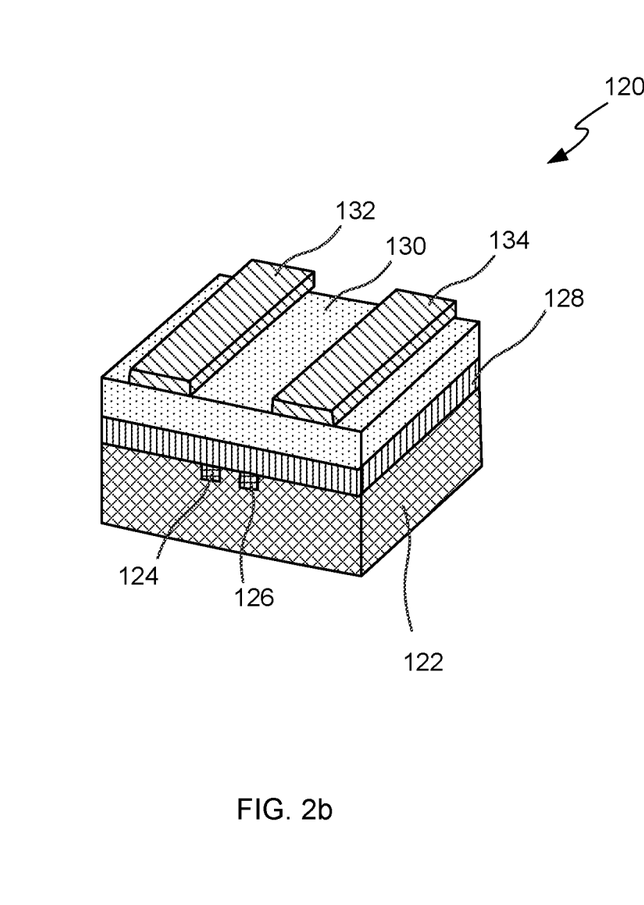

FIGS. 2a and 2b are presented only by way of example and other similar devices can be envisaged. Other types of hybrid silicon $\chi^2$ devices other than modulators can be designed and fabricated as described herein. In addition, the processing can be used for any hybrid chip which is made of materials where at least one material is CMOS compatible and at least one is non-compatible. The resultant device can this include elements or layers that are CMOS compatible and elements or layers that are not.

Figure 3:
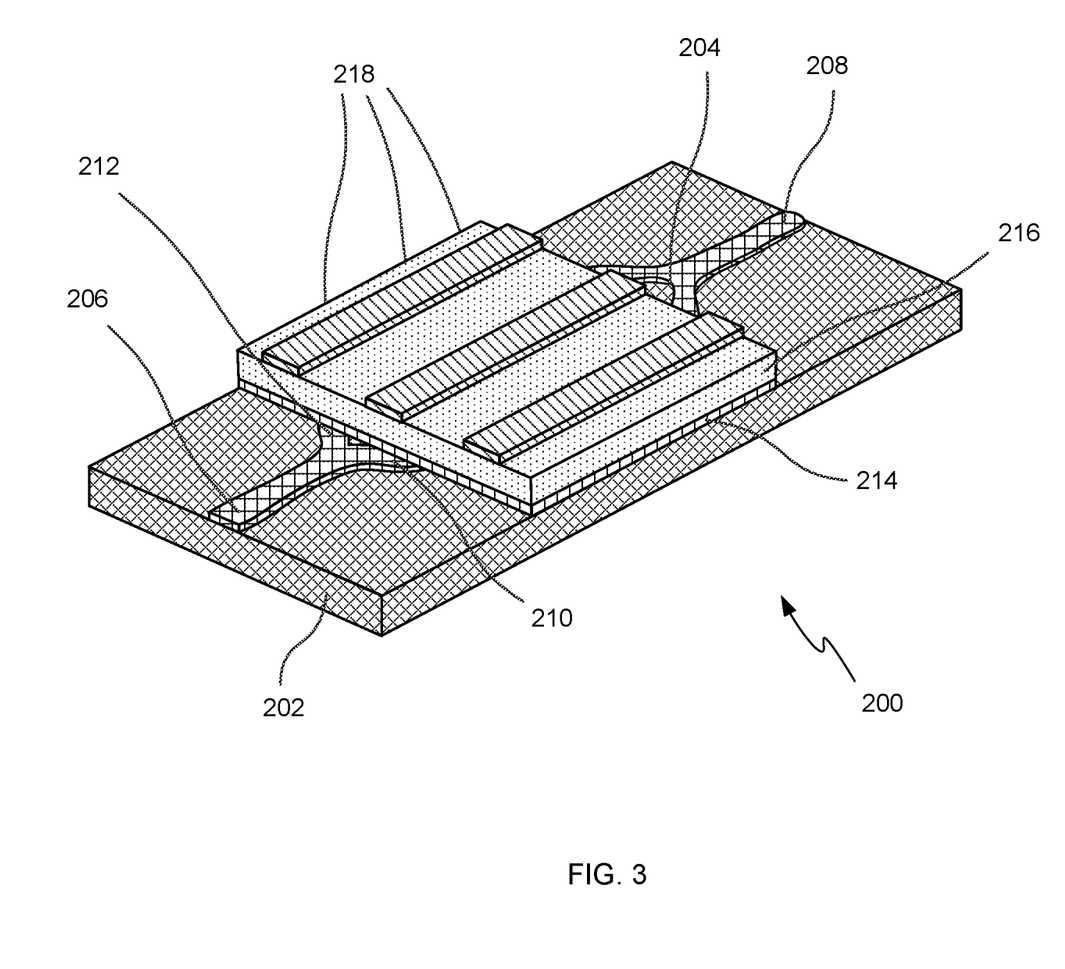
FIG. 3 shows a schematic diagram of device of a full modulator, according to an embodiment of the invention.

FIG. 3 shows a further device 200 having similar advantages. The device 200 is a Mach-Zehnder push pull configuration modulator having two phase shifters. The device includes a buried oxide layer 202 over which a waveguide 204 is located. The waveguide includes an input 206 and an output 208 and two parallel arms or paths 210, 212 connected between the input and output. Lithium niobate 214 is located over the waveguide and buried oxide layer. A silicon dioxide layer 216 and electrodes 218 are then applied.

Figure 4:
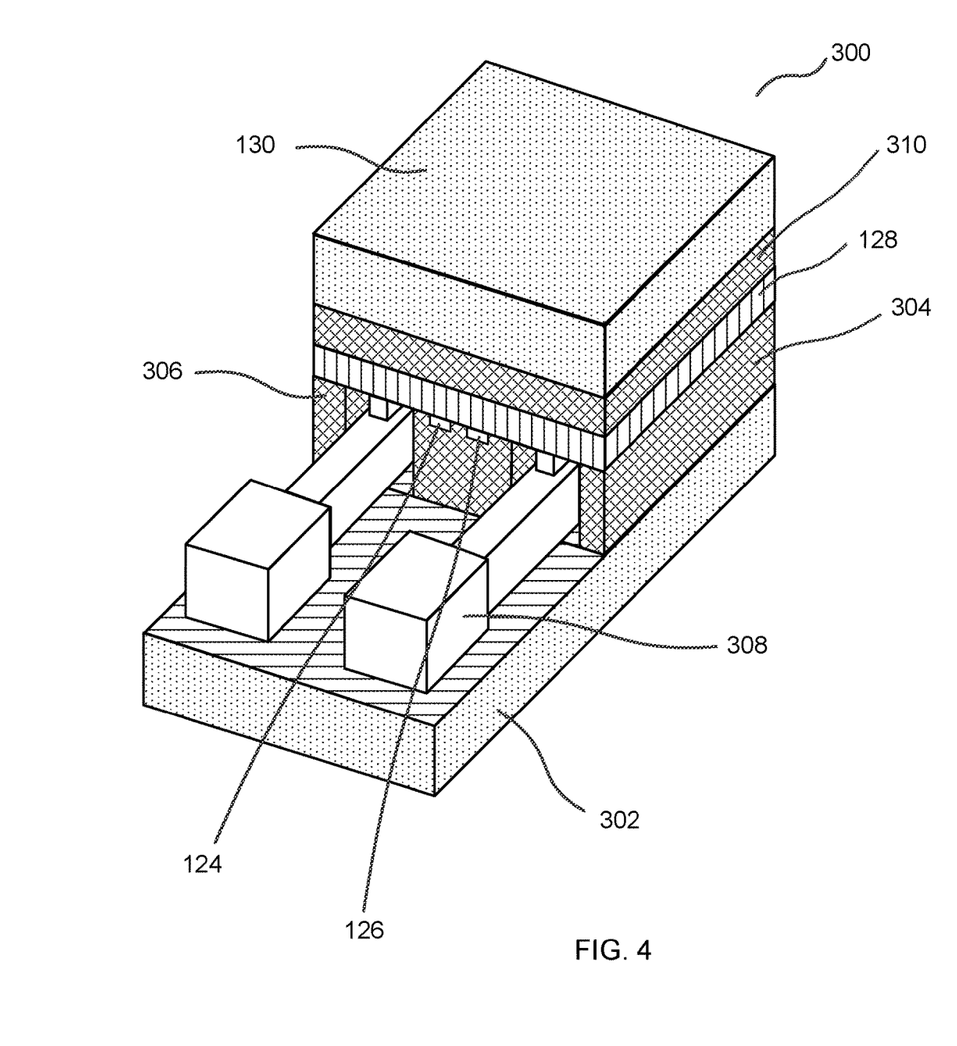
FIG. 4 is a diagram showing a further device, according to an embodiment of the invention. In this figure the electrodes are below the $\chi^2$ material.
Figure 6:
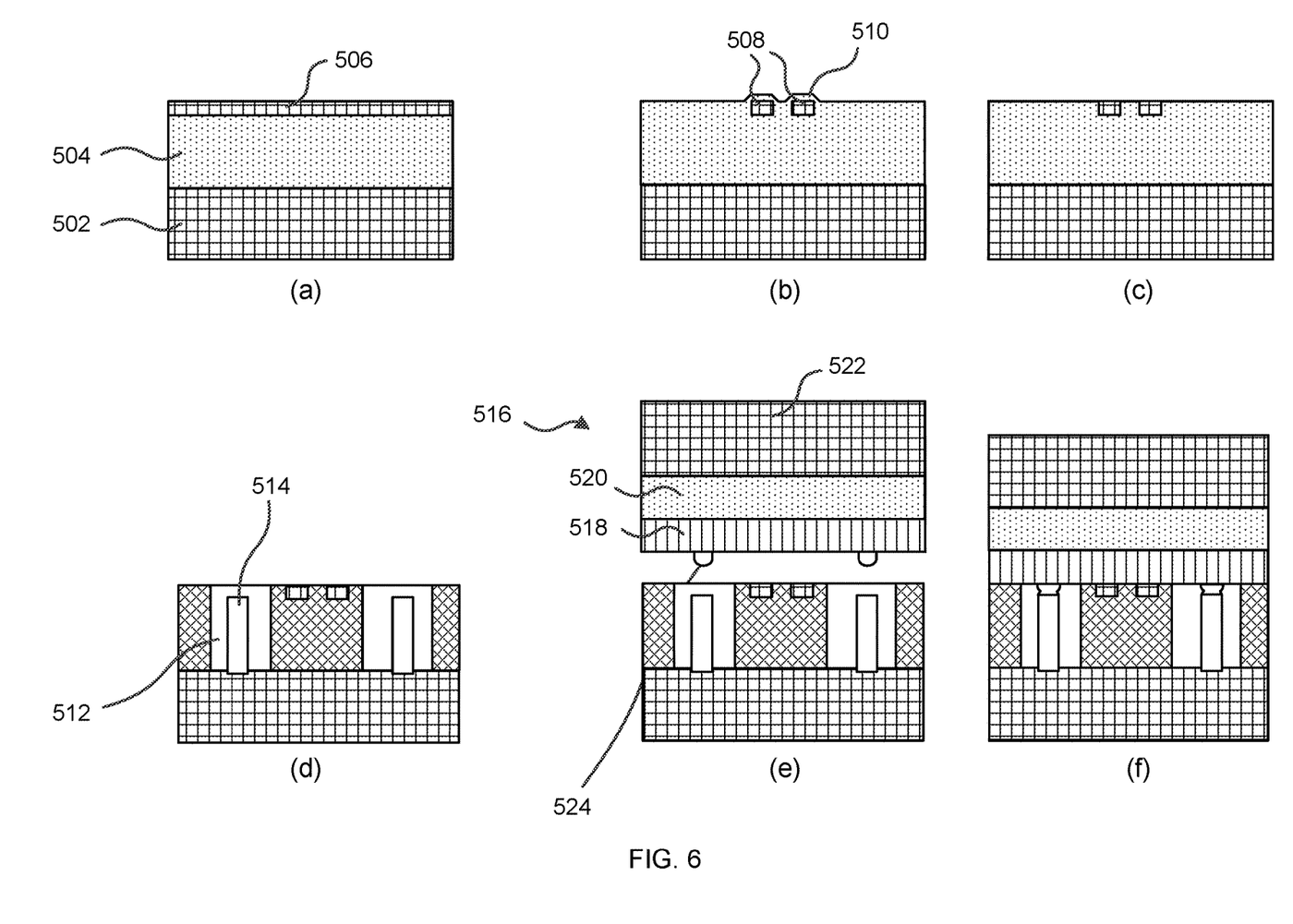
FIGS. 6a to 6e show the manufacturing steps for forming the FIG. 4 device.

FIG. 4 is a still further device 300 with electrodes incorporated into the device and applied via a different mechanism as will be described below in FIG. 6. In FIG. 4 the waveguides are positioned below the lithium niobate layer. The device 300 comprises a substrate layer 302 which may be silicon dioxide or silicon, over which further buried oxide 304 is patterned to leave spaces 306 which may later accommodate electrodes 308. The structure can then comprise any appropriate device, for example as shown in FIGS. 2a, 2b and 3. In FIG. 4 the device is similar to FIG. 2b and includes the buried oxide layer 304 in which waveguides 124 and 126 are formed. Lithium niobate 128 is located and in contact with the waveguides. A further layer of silicon dioxide 310 is located over the lithium niobate 128. A silicon substrate 130 is located over the further layer of silicon dioxide 310.

Figure 5:
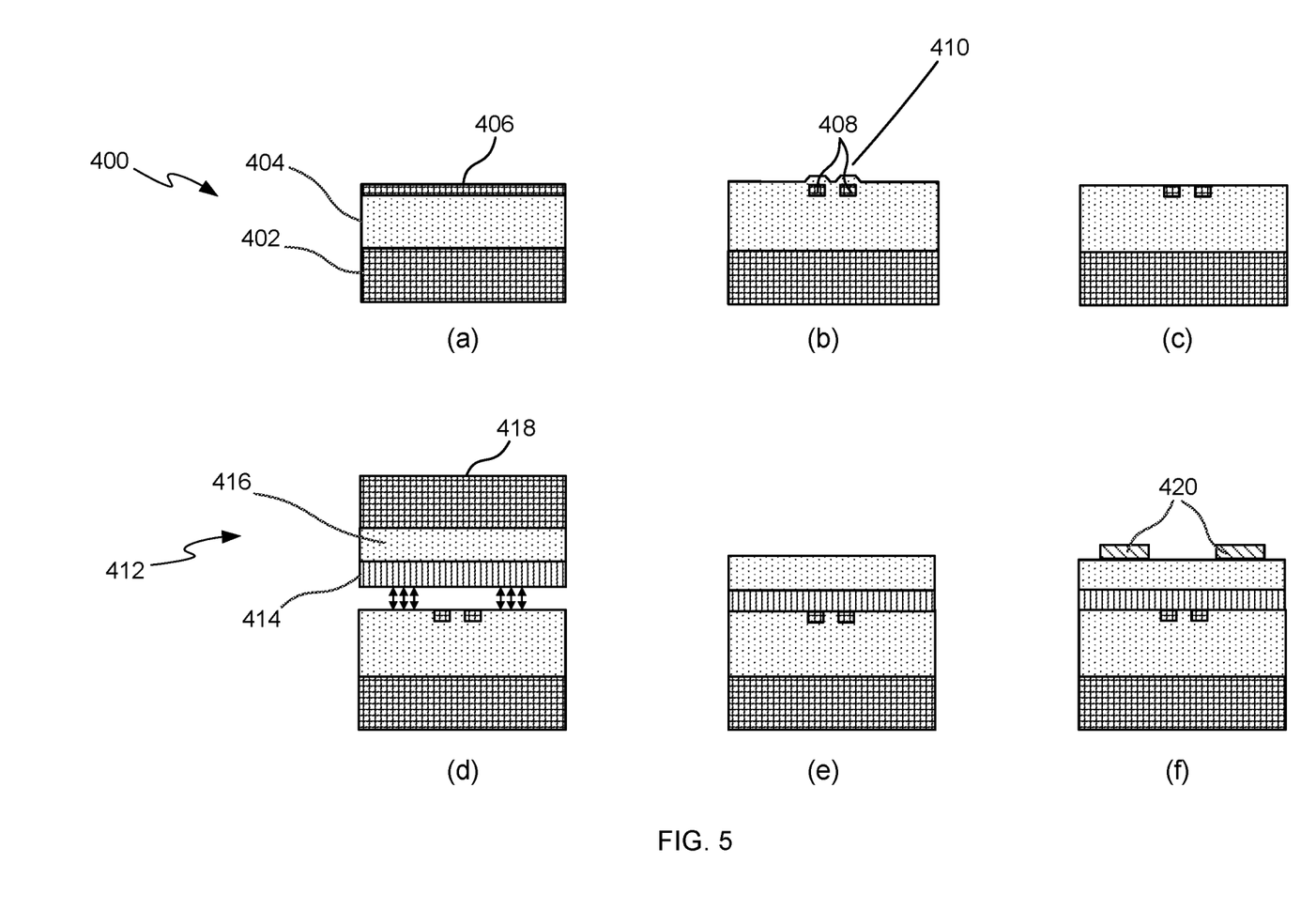
FIGS. 5a to 5f are diagrams showing the fabrication process of a device, according to an embodiment of the present invention.

A process for fabricating the FIG. 2b device will now be described with reference to FIG. 5. In a first step a silicon on insulator (SOI) wafer is taken as shown in FIG. 5a. The SOI wafer 400 includes a layer of silicon 402; a layer of buried oxide 404 and a thinner silicon layer 406. In FIG. 5b, silicon waveguides 408 are lithographically defined, and additional silicon dioxide 410 is deposited. In FIG. 5c the deposited silicon dioxide is subsequently planarized. In FIG. 5d a lithium niobate on insulator chip 412 is wafer or flip-chip bonded on to the substrate. The chip includes a layer of lithium niobate layer 414; a silicon dioxide layer 416 and a substrate 418. As shown in FIG. 5e, the lithium niobate chip 412 is ground down as close to the top silicon dioxide layer as possible. Any remaining silicon can be etched until the top of the silicon dioxide layer is exposed. In FIG. 5f electrodes 420 are deposited and patterned.

As described with reference to FIG. 6, the process of bonding can also include the electrodes where the electrodes are located to be suitable for wire bonding.

In a first step a silicon on insulator (SOI) wafer is taken as shown in FIG. 6a. The SOI wafer 500 includes a layer of silicon 502; a layer of buried oxide 504 and a thinner silicon layer 506. In FIG. 6b, silicon waveguides 508 are lithographically defined and silicon dioxide 510 is deposited. In FIG. 6c the deposited silicon dioxide is subsequently planarized. In FIG. 6d two gaps 512 are etched into the silicon dioxide. A mask is used to deposit electrodes 514 inside the gaps created. In FIG. 6e a lithium niobate on insulator chip 516 is flip-chip bonded on to the substrate. The chip includes a layer of lithium niobate layer 518; a buried oxide layer 520 and a silicon substrate 522. In addition, the chip includes bonding pads 524 which are intended to allow under bump metallization to connect the chip to the electrode 514. FIG. 6f shows the final location of the lithium niobate chip connected to the electrodes 514. Further processing may then be carried out, such as grinding and etching to remove silicon if necessary or any other appropriate processing for the device required.

Figure 7:
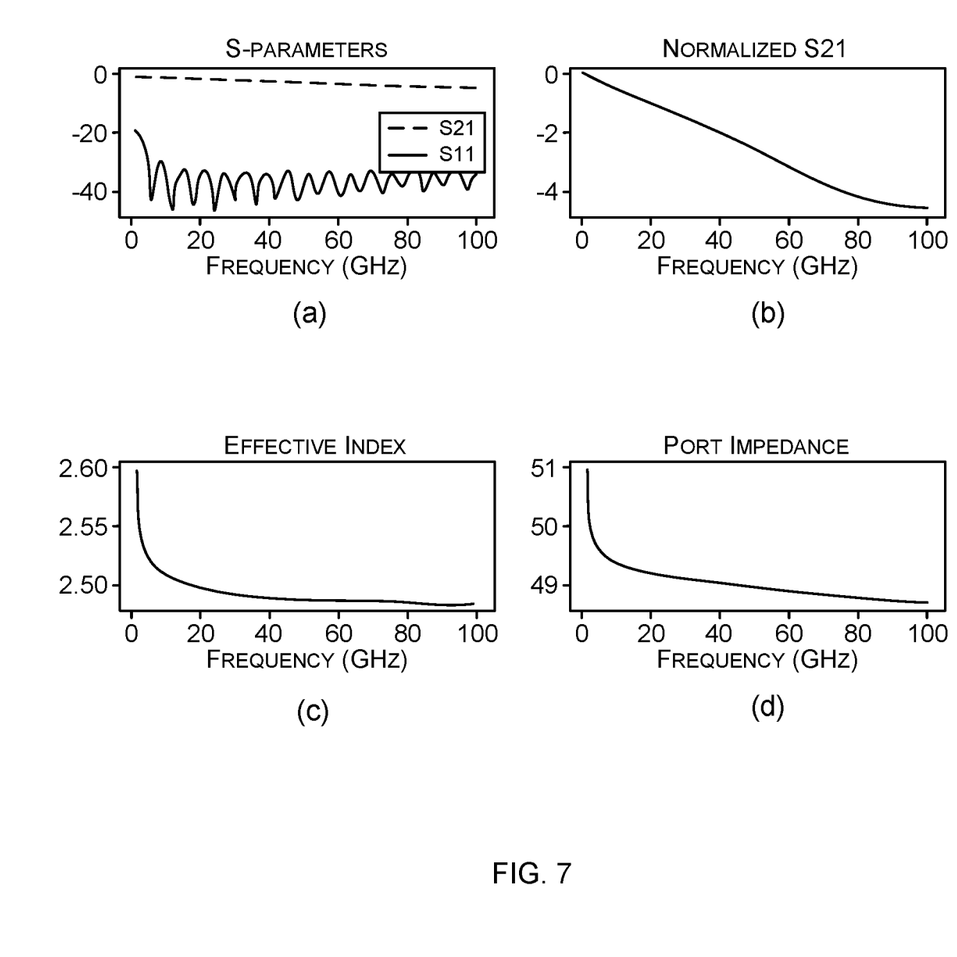
FIGS. 7a to 7d is a set of graphs showing some of the performance parameters for devices according to embodiments of the invention.

The devices offer a number of advantages. These include, by way of example: higher modulation speed obtainable than in silicon photonics platform; mode confined within $\chi^2$ region allowing higher modulation efficiency; there is no processing (etching) of lithium niobate; and the process is CMOS compatible. The process can be applied to other hybrid chips where there is a part that is made by the CMOS fabrication process and a part which is flip chipped onto the CMOS part. The hybrid chip is one with elements that are CMSO compatible and elements that are not. Materials that are not CMSO compatible include the $\chi^2$ materials by way of example In silicon photonics, a coplanar waveguide (CPW) is loaded with a PN junction. This can significantly reduce the −3 dB bandwidth (and therefore the modulation speed). A travelling wave CPW on lithium niobate will be significantly faster than that of silicon photonics due to the fact that it is just a CPW without a loaded PN junction. The Pockels effect or the linear electro-optic effect, which is present in lithium niobate, is also a field effect and is therefore significantly faster than the carrier depletion effect of silicon photonics. With the structure described above the graphs of FIG. 7 shown certain finite element method (FEM)-based simulations showing the S21 −3 dB point to be over 60 GHz. In general, the electro-optic −3 dB response is near the electrical −6 dB point, which is over 100 GHz as shown in FIG. 7b. FIG. 7a shows that the S11 reflection can be well controlled and be under −20 dB. FIG. 7c shows that the effective index of the microwave mode can match that of the hybrid waveguide. FIG. 7d shows that the port impedance can also be simultaneously matched to 50 Ohms.

As mentioned the mode is confined to a nonlinear $\chi^2$ region. By designing the silicon waveguides, we can allocate most of the mode into the lithium niobate. This is important as typically loaded waveguides have much of the mode only in the additional loaded section.

Figure 8:
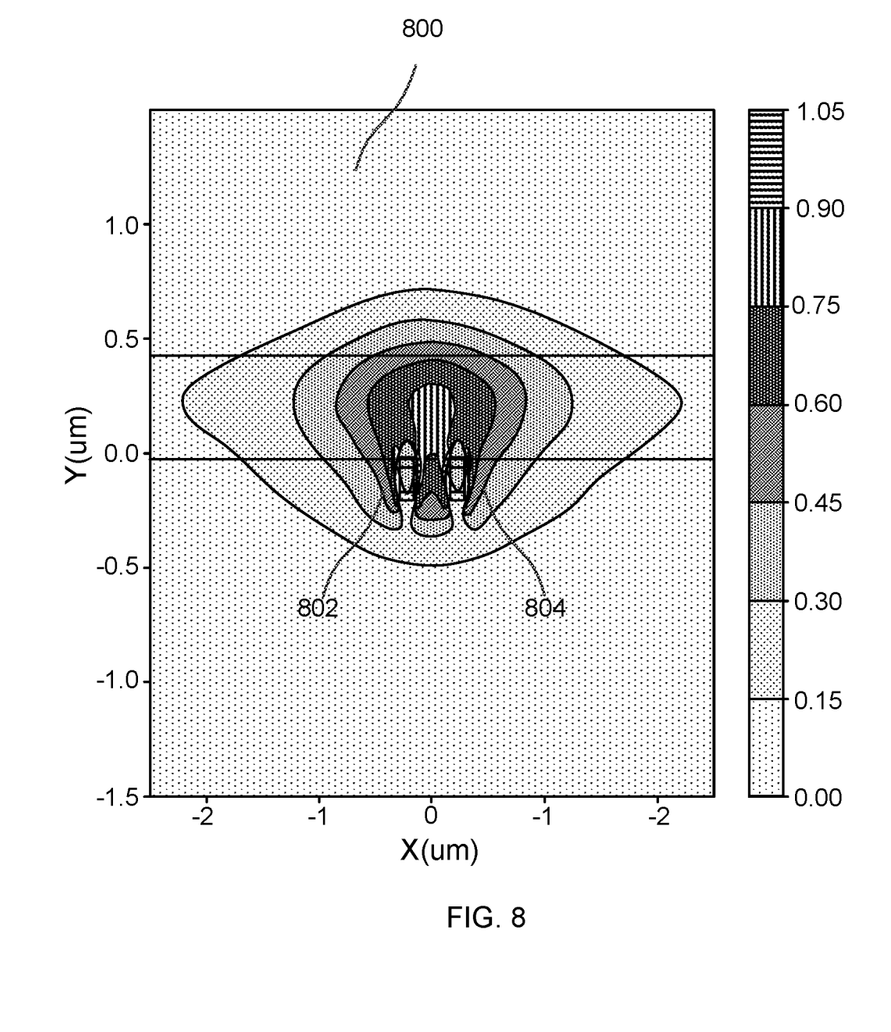
FIG. 8 is an optical mode profile of twin nano-strip loaded lithium niobate waveguide as shown in previous figures.

The design is facilitated by optimizing the number, geometry and separation of the silicon nano-strips. In this configuration with two silicon strips 124 and 126 in FIG. 2b, each individual cannot support single mode. However, since they are placed in an optimized geometry it is possible to support a non-radiative single-mode primarily in the nonlinear region (i.e. the lithium niobate) as opposed to the silicon. As a result the optical mode is caused to reside in the lithium niobate layer 804 rather than in the silicon strips 800, 802. This is shown figuratively in FIG. 8.

As etching of nonlinear $\chi^2$ material is not required further advantages are achieved. Etching lithium niobate is a difficult step in any situation but more so if it is to be added to standard CMOS processing, as the etching by-product can contaminate the chamber. This can be especially problematic for Inductively Coupled Plasma Reactive-ion etching (ICP/RIE) processes. By not having any processing steps which involve lithium niobate, the CMOS processing line is not exposed to any additional contaminants. Also, lithium niobate is a difficult material to etch and usually produces a high amount of sidewall roughness as well as a shallow sidewall angle. Avoiding any processing of the lithium niobate helps reduce any roughness-induced propagation losses.

The devices produces a high electric field strength (compared to traditional diffused lithium niobate modulators). Due to the advantageous geometry of the structure and the smaller size of the optical mode, the electrodes can be placed closer together. For example, the electrode separation can be as low as 5 μm without imposing significant metal absorption loss. For example, electric field simulations show that the normalized electric field over the active region to be averaged at for example 598 800 V/m, for the application of 1 W over the port, for a gap of 11 μm. This is 85 542 V/m for each volt that is applied. The coplanar waveguide design can be modified to adapt to the closer spacing of the electrodes. This gives a further advantage of a smaller device footprint.

The devices according to the invention requires a relatively low driving voltage when compared with conventional lithium niobate designs.

The above described embodiments and advantages are by way of example. There may be numerous variations which could be implement and still form part of the scope of the invention. The following modifications are certain example of this.

The SOI substrate can be replaced with any type of substrate that a waveguide can be defined in, such as SiN, polymer-on-SiO2, etc. The nonlinear optic material can be any nonlinear material, such as lithium niobate, electro-optic polymer, lithium tantalate, other $\chi^2$ materials and other electro-optic materials. The method of strip-loading the nonlinear thin film can be substituted by any other waveguide making techniques. The travelling wave electrodes can be defined before or after the flip chip bonding process, and the silicon waveguide can be part of the electrode design. The electrodes can also be recessed into the top silicon by etching. By placing the electrodes closer to the waveguide, the required driving voltage may be decreased.

The present invention may include a number of variations and alternatives to the examples described above. These are intended to be encompassed within the scope of the invention.

Example embodiments include the following.

A hybrid photonic chip comprising a plurality of semiconductor materials arranged to define a chip providing a function, wherein at least a first part of the chip is formed of materials which can be fabricated using a CMOS technique; and at least a second part of the chip is not susceptible to be fabricated during a CMOS technique; wherein the second part of the chip in conjunction with the first part is configured to support a propagating low loss single mode waveguide.

Preferably, the at least second part of the chip comprises a nonlinear crystal material ($\chi^2$ material or any other electro-optic material).

Preferably, the nonlinear crystal material ($\chi^2$ material or any other electro-optic material) includes at least one of: lithium niobate ($LiNbO_3$), lithium tantalate ($LiTaO_3$), potassium niobate ($KNbO_3$), barium titanate ($BaTiO_3$), potassium titanyl phosphate ($KTiOPO_4$), barium borate ($BaB_2O_4$)

Preferably, the first part of the chip comprises one or more silicon strips on a silicon on insulator, SOI, platform that do not support single mode propagation alone.

Preferably, the second part of the chip and the one or more silicon strips support single mode propagation together.

Preferably, the hybrid chip is a modulator.

Preferably, the second part of the chip is a waveguide configured to substantially support the optical mode primarily in the nonlinear crystal material.

Preferably, the modulator is a Mach Zehnder modulator.

Preferably, the first part of the chip includes electrodes.

Preferably, the electrodes are located in gaps in a buried oxide of the first part of the chip to received bonding pads from the second part of the chip.

Preferably, the second part of the chip is applied to the first part of the chip via a flip-chip bonding technique.

Preferably, the electrodes are connected to the second part of the chip during the flip-chip bonding technique.

A method of fabricating a hybrid photonic chip, that excludes the etching of the nonlinear crystal material, the method comprising: forming a first part of a chip from semiconductor materials on a silicon on insulator, Sal, platform using a CMOS fabrication process; applying a second part of the chip without a CMOS processing step to the first part of the chip; the second part of the chip being of material configured to substantially support a single propagation mode of the chip.

Preferably, forming one or more silicon strips on the SOI platform that do not support single mode propagation alone.

Preferably, forming the hybrid chip is a modulator.

Preferably, forming the second part of the chip as a waveguide configured to substantially support the single propagation mode.

Preferably, forming the modulator as a Mach Zehnder modulator.

Preferably, forming electrodes as a part of the first part of the chip.

Preferably, etching gaps into a buried oxide layer of the SOI platform; forming the electrodes located in the gaps in the buried oxide of the first part of the chip to received bonding pads from the second part of the chip.

Preferably, applying the second part of the chip to the first part of the chip in a flip-chip bonding technique.

Preferably, the electrodes are connected to the second part of the chip during the flip-chip bonding technique.

There is provided a process design kit for forming the hybrid photonic chip disclosed herein, comprising: parameters to form the first part of the chip comprising the silicon and the electrodes using a CMOS fabrication process; parameters to form the second part of the chip comprising the nonlinear crystal material; and parameters to integrate the first and second parts of the chip without a CMOS processing step, wherein the process design kit is configured to integrate the first part of the chip with the second part of the chip to support the propagating single mode.

A computer readable storage medium having stored thereon a computer readable description of a chip that, when processed in chip fabrication system, causes chip fabrication system to manufacture a photonic integrated chip of another embodiment.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in a process design kit configures the system to manufacture some or all of the devices herein.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

There may be provided a method of manufacturing, at process design kit as described herein. Furthermore, there may be provided process design kit dataset that, when processed in an chip fabrication system, causes the method of manufacturing a PIC and/or asymmetric alignment arrangement as described herein.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A hybrid photonic chip comprising:
    at least a first part of the chip comprising silicon and electrodes; and
    at least a second part of the chip comprising a nonlinear crystal material, wherein the second part of the chip has not been subjected to etching,
    wherein the at least the first part and at least the second part has been applied to each other via a flip-chip bonding technique,
    wherein the second part of the chip in conjunction with the first part of the chip is configured to support a propagating single mode, and
    wherein the first part of the chip comprises one or more silicon strips on a silicon on insulator (SOI) platform that do not support the propagating single mode alone.

2. The hybrid photonic chip according to claim 1, wherein the nonlinear crystal material includes at least one of: lithium niobate ($LiNbO_3$), lithium tantalate ($LiTaO_3$), potassium niobate ($KNbO_3$), barium titanate ($BaTiO_3$), potassium titanyl phosphate ($KTiOPO_4$), barium borate ($BaB_2O_4$).

3. The hybrid photonic chip according to claim 1, wherein the second part of the chip and the one or more silicon strips support the propagating single mode together.

4. The hybrid photonic chip according to claim 1, wherein the hybrid chip is a modulator.

5. The hybrid photonic chip according to claim 4, wherein the second part of the chip is a waveguide configured to substantially support the propagating single mode primarily in the nonlinear crystal material.

6. The hybrid photonic chip according to claim 4, wherein the modulator is a Mach Zehnder modulator.

7. The hybrid photonic chip according to claim 1, wherein the electrodes are located in gaps in a buried oxide of the first part of the chip to receive bonding pads from the second part of the chip.

8. The hybrid photonic chip according to claim 1, wherein the electrodes are connected to the second part of the chip during the flip-chip bonding technique.

9. A method of fabricating a hybrid photonic chip, that excludes etching of nonlinear crystal material, the method comprising:
    forming a first part of a chip from silicon using a CMOS fabrication process, wherein the first part of the chip includes a silicon on insulator (SOI) platform;
    forming electrodes as a part of the first part of the chip;
    forming one or more silicon strips on the SOI platform that do not support a propagating single mode alone; and
    applying a second part of the chip comprising the nonlinear crystal material to the first part of the chip by a flip-chip bonding technique, wherein the nonlinear crystal material is not subjected to the etching;
    wherein the second part of the chip in conjunction with the first part of the chip substantially supports the propagating single mode.

10. The method of claim 9, wherein the nonlinear crystal material ($X^2$ material) includes at least one of: lithium niobate ($LiNbO_3$), lithium tantalate ($LiTaO_3$), potassium niobate ($KNbO_3$), barium titanate ($BaTiO_3$), potassium titanyl phosphate ($KTiOPO_4$), barium borate ($BaB_2O_4$).

11. The method of claim 9, further comprising forming the hybrid chip as a modulator.

12. The method of claim 11, further comprising forming the second part of the chip as a waveguide configured to substantially support the propagating single mode.

13. The method of claim 11, further comprising forming the modulator as a Mach Zehnder modulator.

14. The method according to claim 9, further comprising etching gaps into a buried oxide layer of a SOI platform in the first part of the chip; forming the electrodes located in the gaps in the buried oxide of the first part of the chip to receive bonding pads from the second part of the chip.

15. The method according to claim 9, wherein the electrodes are connected to the second part of the chip during the flip-chip bonding technique.

16. A process design kit for forming the hybrid photonic chip of claim 1, comprising:
- parameters to form the first part of the chip comprising the silicon and the electrodes using a CMOS fabrication process;
- parameters to form the second part of the chip comprising the nonlinear crystal material; and
- parameters to integrate the first and second parts of the chip without a CMOS processing step, wherein the process design kit is configured to integrate the first part of the chip with the second part of the chip to support the propagating single mode.

17. A computer readable storage medium having stored thereon, a computer readable description of the hybrid photonic chip that, when processed in chip fabrication system, causes the chip fabrication system to execute the method according to claim 9.

* * * * *